(12) United States Patent
Tomescu et al.

(10) Patent No.: US 11,603,842 B2
(45) Date of Patent: Mar. 14, 2023

(54) METHOD OF PRIMING A PUMP OF AN AIRCRAFT ENGINE

(71) Applicant: PRATT & WHITNEY CANADA CORP., Longueuil (CA)

(72) Inventors: Dana Tomescu, Brampton (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 504 days.

(21) Appl. No.: 16/540,589

(22) Filed: Aug. 14, 2019

(65) Prior Publication Data
US 2021/0048026 A1  Feb. 18, 2021

(51) Int. Cl.
| | | |
|---|---|---|
| *F04C 29/02* | (2006.01) | |
| *F04C 27/00* | (2006.01) | |
| *F04D 29/063* | (2006.01) | |
| *F04C 18/16* | (2006.01) | |
| *F16N 7/36* | (2006.01) | |
| *F04C 15/00* | (2006.01) | |

(52) U.S. Cl.
CPC ............ *F04C 29/023* (2013.01); *F04C 18/16* (2013.01); *F04C 27/009* (2013.01); *F04C 29/025* (2013.01); *F04D 29/063* (2013.01); *F16N 7/36* (2013.01); *F04C 15/0088* (2013.01); *F05B 2240/57* (2013.01); *F05B 2260/98* (2013.01); *F16N 2210/02* (2013.01)

(58) Field of Classification Search
CPC ............ F05B 2260/98; F05B 2220/302; F16D 23/0214; F16D 2300/0214; F04D 9/003; F04D 29/06; F04C 2/025; F04C 2/082; F04C 13/007; F04C 15/0003; F04C 15/0053; F04C 2220/40
USPC .......................................................... 464/17
See application file for complete search history.

(56) References Cited

U.S. PATENT DOCUMENTS

| | | | | |
|---|---|---|---|---|
| 2,750,894 | A | * | 6/1956 | Thomas ................. F04D 29/108 415/111 |
| 3,260,872 | A | | 7/1966 | Potter |
| 3,368,799 | A | * | 2/1968 | Sluijters ................. D01D 1/065 366/150.1 |
| 3,450,052 | A | * | 6/1969 | Turner et al. ....... F04C 15/0088 417/203 |
| 4,285,632 | A | * | 8/1981 | DeSalve ................. F01D 25/18 384/322 |
| 4,469,078 | A | * | 9/1984 | Speer .................... F02B 37/164 244/57 |
| 4,480,970 | A | * | 11/1984 | Smith ................. F04C 15/0053 418/206.8 |

(Continued)

*Primary Examiner* — Nathan C Zollinger
*Assistant Examiner* — Timothy P Solak
(74) *Attorney, Agent, or Firm* — Norton Rose Fulbright Canada LLP

(57) ABSTRACT

A method of priming a pump includes supplying lubricant, via a priming flow path, into an interface defined between a first part of a shaft of the pump and a second part of the shaft coaxially engaged with the first part of the shaft to define the pump, the first part of the shaft rotatable about a rotation axis relative to the second part of the shaft, and supplying lubricant into the interface via a lubrication flow path that is different from the priming flow path. A method of lubricating an aircraft motor of an aircraft engine, and a machine for an aircraft engine are also described.

9 Claims, 8 Drawing Sheets

(56) References Cited

U.S. PATENT DOCUMENTS

| | | | |
|---|---|---|---|
| 4,942,944 A * | 7/1990 | Frey | F16H 57/0434 |
| | | | 384/473 |
| 4,958,991 A * | 9/1990 | Kikuchi | F04C 23/008 |
| | | | 418/55.6 |
| 5,662,463 A | 9/1997 | Mirzoev et al. | |
| 6,966,746 B2 | 11/2005 | Cardenas et al. | |
| 8,257,063 B2 | 9/2012 | Sato et al. | |
| 8,456,051 B2 | 6/2013 | Raad | |
| 8,760,014 B2 | 6/2014 | Birdi et al. | |
| 9,148,041 B2 | 9/2015 | Knoblauch | |
| 2010/0193294 A1* | 8/2010 | Hritz | F01M 5/02 |
| | | | 184/6.3 |
| 2018/0223682 A1* | 8/2018 | Hendrickson | F02C 7/06 |
| 2018/0351434 A1 | 12/2018 | Knoblauch et al. | |

\* cited by examiner

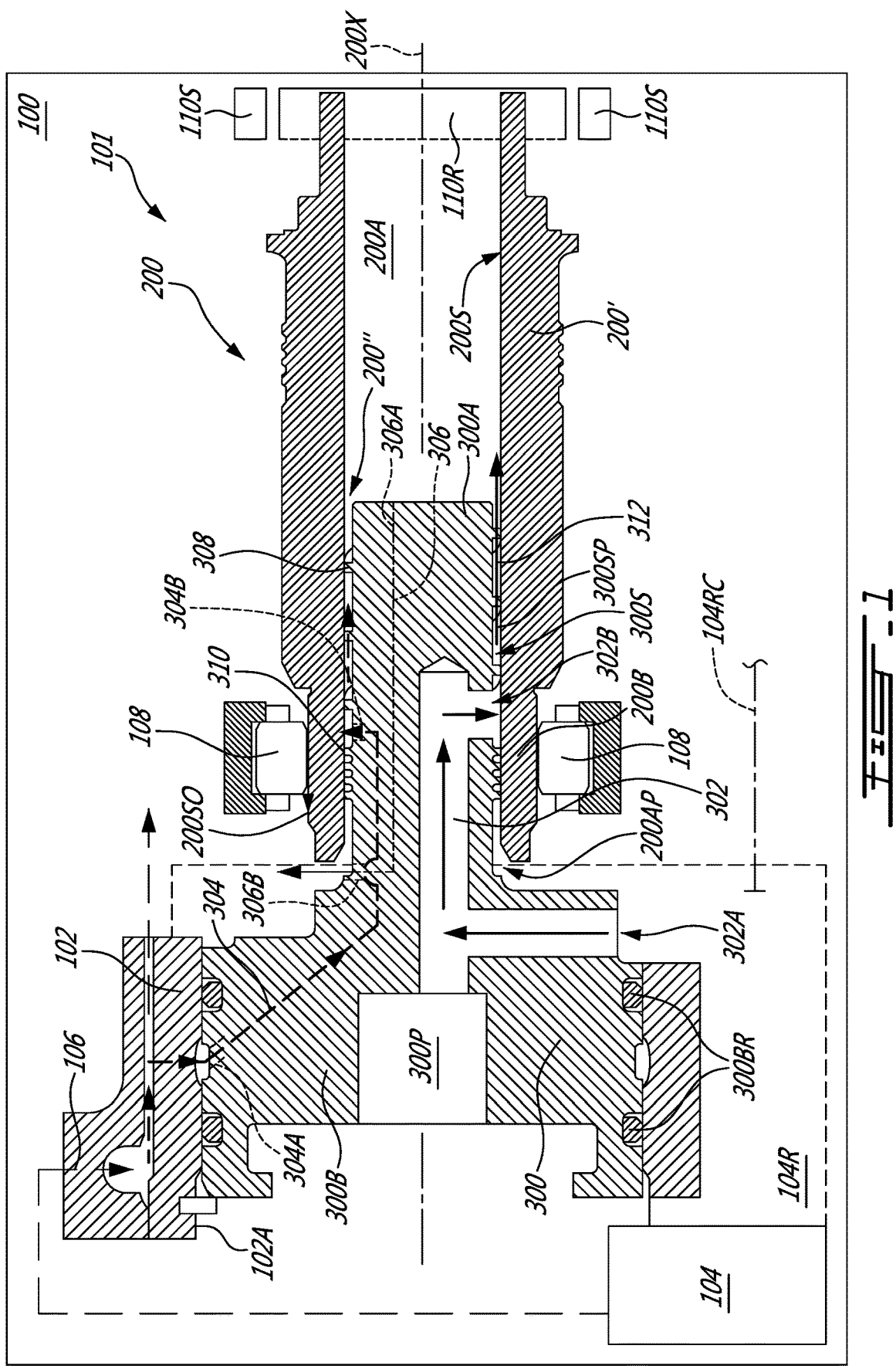

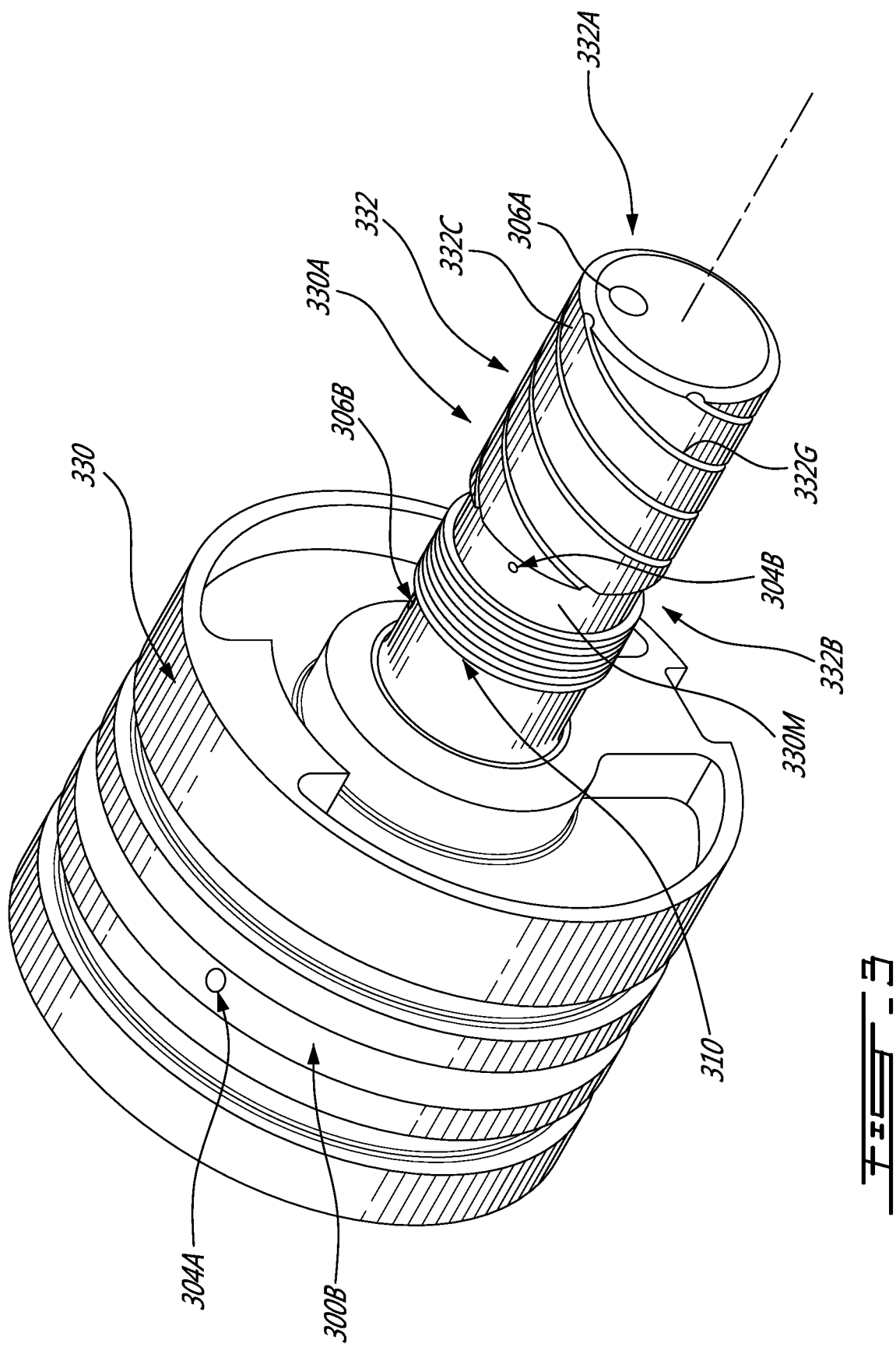

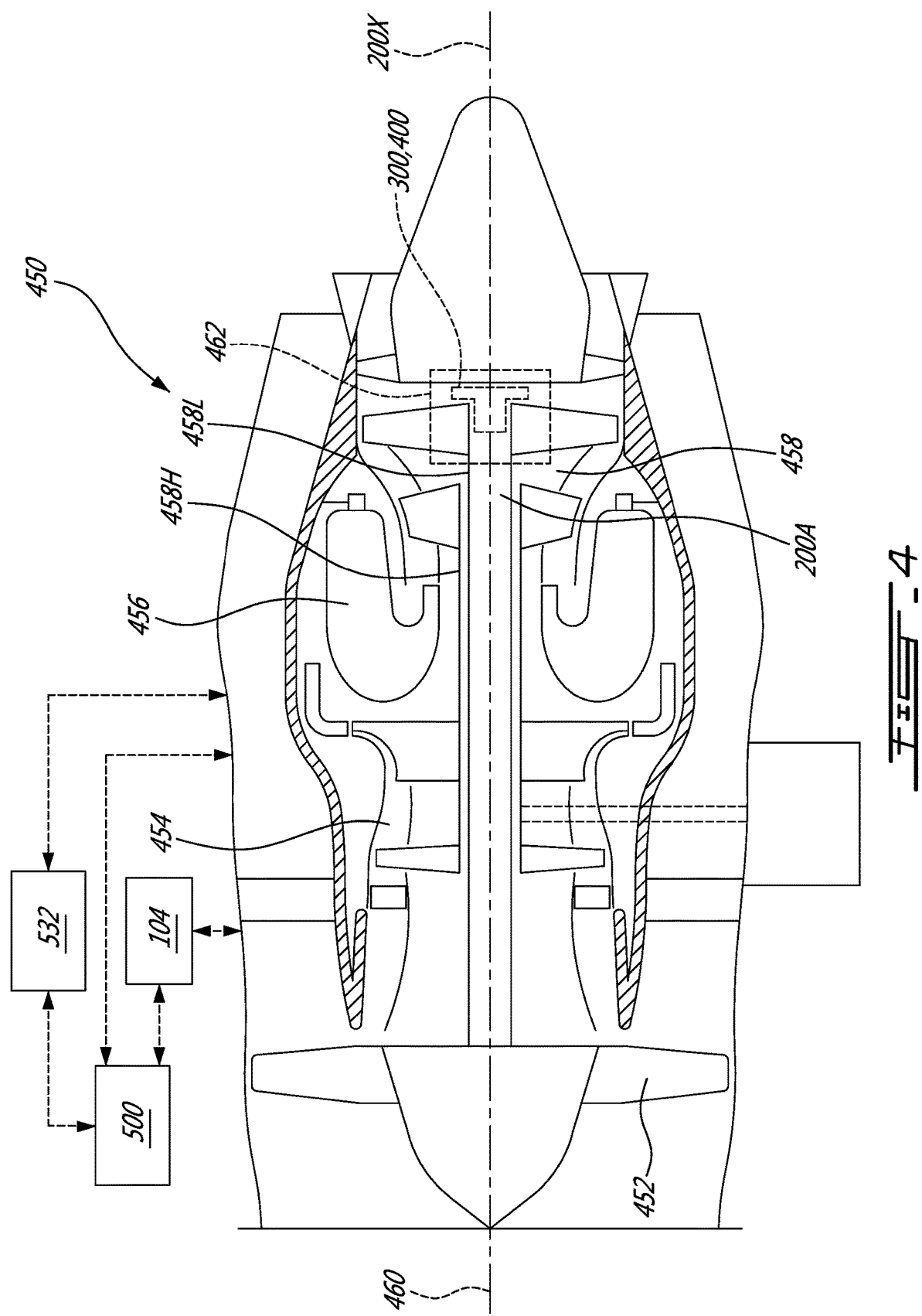

METHOD OF PRIMING A PUMP OF AN AIRCRAFT ENGINE

TECHNICAL FIELD

The application relates to machines for aircraft, such as machines including pumping features.

BACKGROUND

Prior art machines for aircraft, such as electric starters and/or electric generators and aircraft engines, may be suitable for their purposes. Some such machines may integrate pumping features, for different reasons such as cooling, lubricating, among others. However, improvements to prior art machines for aircraft are possible and desirable to ensure the efficient operation.

SUMMARY

In one aspect, the present technology provides a method of priming a pump, comprising: supplying lubricant, via a priming flow path, into an interface defined between a first part of a shaft of the pump and a second part of the shaft coaxially engaged with the first part of the shaft to define the pump, the first part of the shaft rotatable about a rotation axis relative to the second part of the shaft; and supplying lubricant into the interface via a lubrication flow path that is different from the priming flow path.

In some embodiments, the method comprises supplying lubricant to the lubrication flow path from a first lubricant source upstream of the pump, and supplying lubricant to the priming flow path from a second lubricant source upstream of the pump, the second lubricant source being different from the first lubricant source.

In some embodiments, the method comprises pressurizing the first lubricant source to a first pressure, and pressurizing the second lubricant source to a second pressure that is different from the first pressure.

In some embodiments, the supplying lubricant via the priming flow path is executed at a lower flow rate and a higher pressure than the supplying lubricant via the lubrication flow path.

In some embodiments, the method comprises rotating the first part of the shaft about the rotation axis relative to the second part of the shaft.

In some embodiments, the supplying lubricant via the lubrication flow path includes moving lubricant through a helical feature disposed in the interface.

In some embodiments, the method comprises venting an axial channel of the first part of the shaft through the second part of the shaft.

In some embodiments, the supplying lubricant into the interface via the priming flow path is started prior to starting the pump.

In some embodiments, the starting the pump includes rotating the first part of the shaft relative to the second part of the shaft about the rotation axis and the method further comprising allowing the second part of the shaft to pivot about the rotation axis.

In some embodiments, the method comprises allowing the second part of the shaft to translate relative to the first part of the shaft along the rotation axis.

In another aspect, the present technology provides a method of lubricating an aircraft motor, comprising: supplying lubricant into a shaft of the motor from a first lubricant source; and supplying lubricant into the shaft of the motor from a second lubricant source that is different from the first lubricant source.

In some embodiments, the method comprises pressurizing the first lubricant source to a first pressure, and pressurizing the second lubricant source to a second pressure that is different from the first pressure.

In some embodiments, the second pressure is higher than the first pressure.

In some embodiments, the operating the motor includes rotating a first part of the shaft about a rotation axis relative to a second part of the shaft engaged with the first part of the shaft coaxially with the first part of the shaft, and the supplying lubricant from the first and second lubricant sources is through the second part of the shaft.

In some embodiments, the method comprises circulating lubricant from the first and second lubricant sources through the first part of the shaft, and venting the lubricant flow path through the second part of the shaft.

In another aspect, the present technology provides a machine for an aircraft engine, comprising: a liquid lubrication system and a shaft, the shaft including a first part rotatable about a rotation axis, and a second part engaged coaxially with the first part, the first part being rotatable relative to the second part about the rotation axis; a helical feature disposed between the first part and the second part and defining a helical pump between the first part and the second part, the helical pump hydraulically connected to the liquid lubrication system: at a first location in the lubrication system via a lubrication flow path defined through the second part of the shaft, and at a second location in the lubrication system via a priming flow path defined through the second part of the shaft, the second location being different from the first location, and the priming flow path being different from the lubrication flow path.

In some embodiments, the priming flow path has a smaller effective diameter than the lubrication flow path and the second location is fluidly upstream of the first location in the lubrication system.

In some embodiments, the first part of the shaft is operatively connected to a rotor of the aircraft engine and the second part of the shaft is received in an axial channel in the first part of the shaft and defines a vent channel through the second part of the shaft, the vent channel being open at one end to the axial channel and at another end at a location in an outer surface of the second part that is disposed outside of the first part of the shaft.

In some embodiments, the machine comprises a seal disposed in an interface between the first and second parts of the shaft, and wherein the lubrication flow path and the priming flow path are open to the interface at locations between the seal and the helical feature.

In some embodiments, the machine comprises a machine frame, and wherein the second part of the shaft is connected to the machine frame so as: a) to be non-rotational but pivotable about the rotation axis, and b) to be translatable along the rotation axis relative to the first part of the shaft.

DESCRIPTION OF THE DRAWINGS

Reference is now made to the accompanying figures in which:

FIG. 1 is a schematic side view showing a machine having a liquid system circulating a liquid;

FIG. 2D is a cross-sectional view of the end portion of FIG. 2A, taken along plane D-D in FIG. 2A;

FIG. 3 is a schematic perspective view showing an alternative embodiment of the end portion of FIG. 2A;

FIG. 4 is a schematic showing an aircraft engine, the engine comprising the shaft of FIG. 1.

DETAILED DESCRIPTION

Figure 2A:
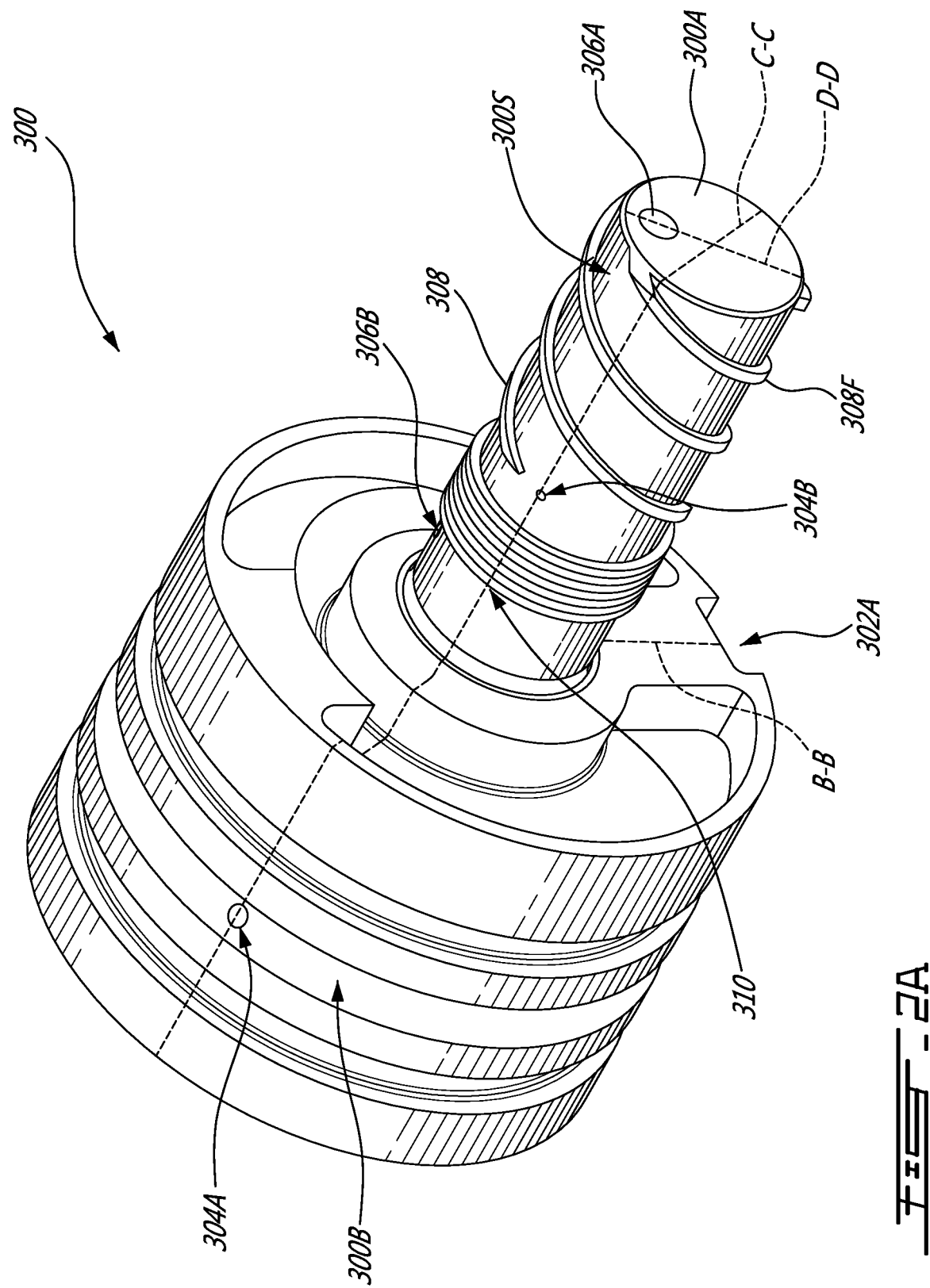
FIG. 2A is a schematic perspective view showing a shaft of the machine of FIG. 1, the shaft having an end portion.

For the purposes of the present description, the term "fuel conduit" is used to describe an arrangement of one or more elements, such as one or more hoses, connectors and other elements, that together form a flow path or flow paths for a liquid fuel to flow from point A to point B. For example, a given fuel conduit may be defined by any number and combination of hoses or tubes hydraulically interconnected in parallel and/or series, by or with one or more fuel filters, switches, pumps, nipples, tees, and the like.

FIG. 1 schematically shows an auxiliary power unit (APU) 100 for an aircraft. It is contemplated that the APU 100 could be of any given APU type that uses at least one rotatable shaft requiring lubrication and/or cooling. The APU 100 is one particular example of a machine with respect to which, or in which, the present technology could be used. It is contemplated that the present technology could be used with a different type of machine that uses one or more rotatable shafts.

For example, it is contemplated that the APU 100, and more particularly the machine 100 in which the present technology could be used, could instead be an engine (an aircraft engine for example), an electric motor, an electric pump, a hybrid fuel/electric motor or pump, a pneumatic or hydraulic motor or pump, an electric generator, a gearbox and the like. One particular example of an electric motor is a starter for an engine.

The APU 100 includes a shaft assembly 101 supported by a machine frame 102, the machine frame 102 being a structure supporting various components of the APU 100. The APU 100 may also have a liquid system 104 (which in the present embodiment is a lubrication system 104) that contains a liquid (in the present embodiment, a lubricant, and more particularly an oil), a rotor 110R and a stator 110S for generating electricity. In the present embodiment, the lubrication system 104 lubricates and/or cools various components of the APU 100. In other embodiments, the system 104 may be a different liquid system. For example, in embodiments where the element/machine 100 is an electric generator, the system 104 is a liquid cooling system of the electric generator. In some such embodiments, the liquid cooling system 104 uses a lubricant such as oil, but other liquids are also contemplated.

As schematically shown in FIG. 1, a shaft assembly 101 is installed in the APU 100 as a part thereof. It is contemplated that a different type of lubricant or a different type of liquid could be used depending on each particular embodiment and application of the shaft assembly 101 and/or the particular embodiment and application of the machine in which the shaft assembly 101 is used. In the present embodiment, the shaft assembly 101 includes a bearing assembly 108 and a shaft 200. The shaft 200 includes a first part 200' and an end portion 300. As described in more detail below, the first part 200' and the end portion 300 define a liquid pump 200" therebetween. In the the present embodiment, the liquid pump 200" is a lubricant pump that circulates at least part of the lubricant in the lubrication system 104 of the APU 100. In other embodiments, the liquid pump 200" circulates other liquids for other purposes, such as circulating a liquid for cooling one or more parts of the machine with which it is used.

In other embodiments, such as where the APU 100 is instead an engine, the pump 200" may be a recirculation pump that lubricates components of the engine and recirculates oil through the lubrication system 104 of the engine. In yet other embodiments, such as where the APU 100 is instead an electric motor, the pump 200" may be a scavenge pump that scavenges oil to a gearbox associated with the electric motor, thereby evacuating hot oil and cooling the electric motor. In such other embodiments, the shaft 200 may serve a different one or more purposes than the purposes described herein with respect to the APU 100 application.

Referring to FIG. 1, in the present embodiment, the first part 200' of the shaft 200 is rotatably interfaced to the machine frame 102 by the bearing assembly 108 and the end portion 300 to rotate about a rotation axis 200X. The first part 200' of the shaft 200 is connected to the rotor 110R to rotate the rotor 110R about the rotation axis 200X relative to the stator 110S.

The first part 200' of the shaft 200 is also connected to a power source or like torque source (not shown) using a connection suitable to the particular embodiment and application of the APU 100 and is driven by the power source to rotate relative to the stator 110S. In other embodiments of the present technology in which the APU 100 is a different machine, the first part 200' of the shaft 200 may be connected to a different one or more elements of the machine and/or to one or more elements that are not part of the machine.

In some embodiments, the power source may be a turbine engine for example. It is contemplated that the power source could be internal or external to the APU 100, or other machine in/with which the shaft assembly 101 is used. It is contemplated that a different power generation assembly/arrangement could be used instead of or in addition to the rotor 110R and the stator 110S. It is contemplated that the APU 100 could have additional and/or other shafts that could be implemented according to the present technology as it is described in this document.

Still referring to FIG. 1, an inner surface 200S of the first part 200' of the shaft 200 defines an axial channel 200A through at least part of the first part 200' of the shaft 200. The axial channel 200A may be hydraulically connected to one or more parts of the APU 100 (or other machine with which the present technology is used) to supply liquid (in this embodiment, lubricant) thereto and to thereby lubricate and/or cool the one or more parts. As shown, the axial channel 200A defines an opening 200AP in an end 200B of the first part 200' of the shaft 200.

The end portion 300 of the shaft 200 is received in the first part 200' of the shaft 200 in the axial channel 200A via the opening 200AP such that the first part 200' of the shaft 200 is rotatable relative to the end portion 300 about the rotation axis 200X. In the present embodiment, the first part 200' of the shaft 200 is rotatable over the end portion 300. In other embodiments, the end portion 300 is disposed over the first part 200' of the shaft 200.

In the present embodiment, and now referring also to FIG. 2A, the end portion 300 includes a cylindrical appendix 300A that is received in the axial channel 200A of the shaft 200, and a base 300B attached to an outer end (not labeled) of the appendix 300A. The expression "cylindrical" is used in cylindrical appendix 300A to refer to the general shape of the appendix, though some surface components may be present whereby the appendix 300A may not be purely cylindrical and/or may have a slight end taper, etc. It is contemplated that the part 300A received in the axial channel 200A could have a different shape, so long as the functionality described in this document is achieved. In the present embodiment, the base 300B is integral with the appendix 300A, but they may be separate interconnected components as well. In the present embodiment, the base 300B is cylindrical in shape. It is contemplated that the base 300B could have a different shape.

Figure 2B:
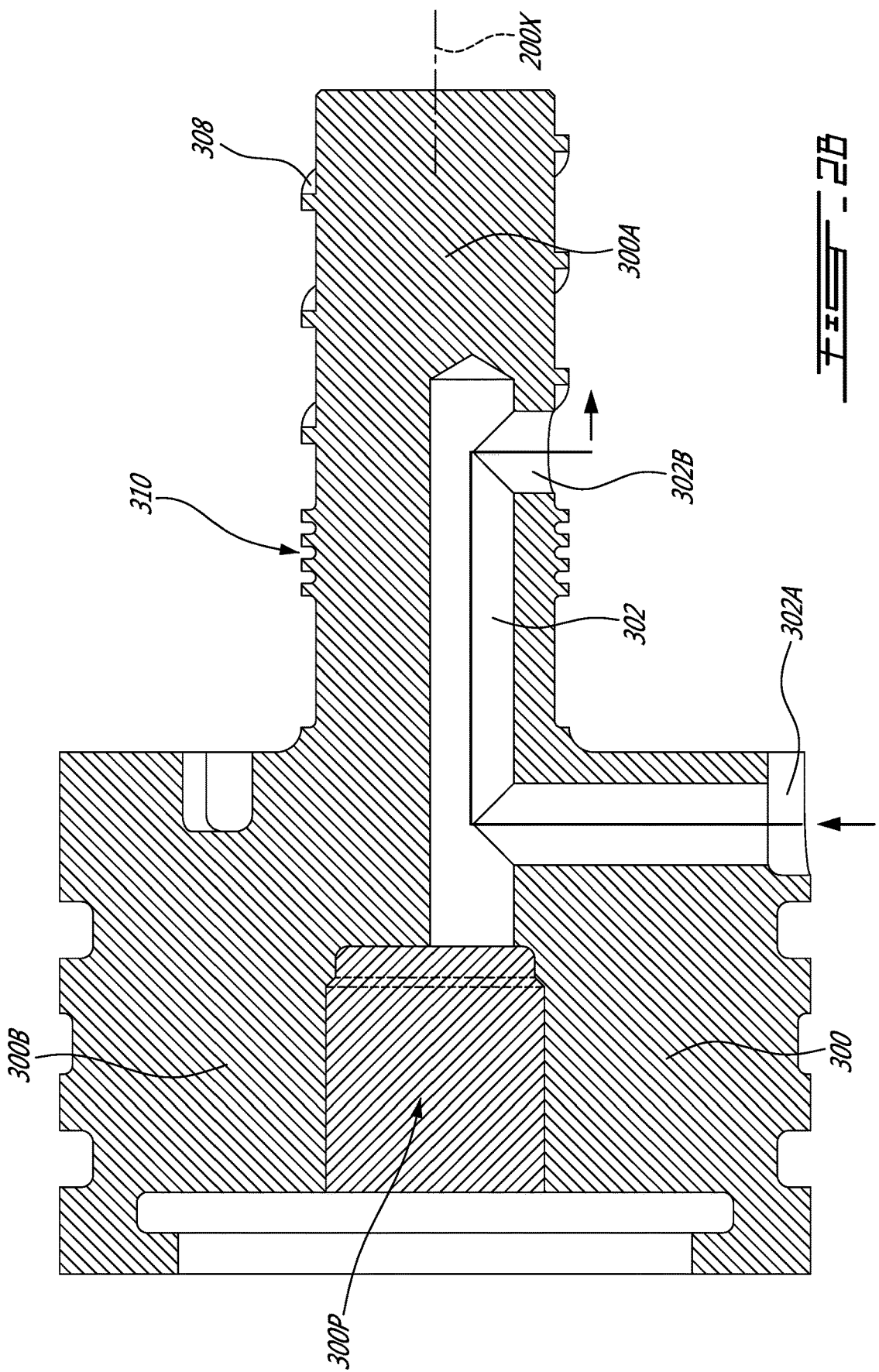
FIG. 2B is a cross-sectional view of the end portion of FIG. 2A, taken along plane B-B in FIG. 2A.

As schematically shown in FIG. 1, and in FIG. 2B, the end portion 300 defines therethrough a lubricant channel 302 along plane B-B shown in FIGS. 2A and 2B. In the present embodiment, the lubricant channel 302 serves to convey lubricant from the lubrication system 104 into the axial channel 200A and then to one or more components of the APU 100 via the shaft 200 at least when the shaft 200 rotates about the rotation axis 200X relative to the end portion 300. It is contemplated that to this end, the shaft 200 could have suitable apertures and/or conduits for delivering lubricant to the one or more components of the APU 100. It is contemplated that in some such embodiments, lubricant may return to the lubrication system 104 via one or more suitable return conduits 104RC.

The lubricant channel 302 includes an opening 302A that serves as an inlet in the present embodiment. As schematically shown in FIG. 1, the opening 302A is defined in the base 300B of the end portion 300, i.e., the base 300B is disposed outside of the shaft 200. The opening 302A is hydraulically connected to a lubricant cavity 104R of the lubrication system 104 to receive lubricant therefrom and to make the lubricant available to the pump 200". In the present embodiment, the base 300B of the end portion 300 is at least in part disposed inside the lubricant cavity 104R. It is contemplated that the base 300B could be positioned entirely outside of the lubricant cavity 104R and could be hydraulically connected thereto by a lubricant conduit extending from the opening 302A to the lubricant cavity 104R.

As shown in FIG. 1, in the present embodiment, the lubricant channel 302 extends through the end portion 300 from the opening 302A to an opening 302B defined in the appendix 300A. The lubricant channel 302 may extend in a same direction as the rotation axis 200X. The opening 302B in this embodiment serves as an outlet and faces the inner surface 200S of the shaft 200. As explained in more detail below, at least when the shaft 200 rotates about the rotation axis 200X relative to the end portion 300, the opening 302B supplies lubricant into an annular space 300SP defined between the inner surface 200S of the shaft 200 and the outer surface 300S of the end portion 300. In the present embodiment, an axis of the opening 302B is radial to the inner surface 200S, but could instead be angled relative thereto. In some embodiments, the opening 302A is angled to make the liquid path through the lubricant channel 302 less arduous.

Still referring to FIG. 1, in the present embodiment, the lubricant channel 302 includes at least an axial portion (not separately labeled) that may extend in parallel to the rotation axis 200X. Stated different a central axis of the lubricant channel 302 may be parallel to the rotation axis 200X. As shown, this axial portion is closed off by a plug 300P. This construction facilitates manufacturing the end portion 300, as it allows the axial portion of the lubricant channel 302 to be drilled into the end portion 300 from the outer end of the end portion 300, with the outer end then being closed off by the plug 300P. It is contemplated that a different manufacturing method could be used to produce the end portion 300 and the various channels therethrough as the channels are described in this document.

Now referring to both FIG. 1 and FIG. 2A, the end portion 300, and more particularly the appendix 300A thereof defines a helical feature 308 that moves lubricant from the lubricant cavity 104R and moves the lubricant into the axial channel 200A of the shaft 200 via the lubricant channel 302 when the shaft 200 rotates about the rotation axis 200X relative to the end portion 300.

As best shown in FIG. 2A, in the present embodiment the helical feature 308 is at least one helical fin 308F that extends circumferentially about the outer surface 300S of the appendix 300A and about the rotation axis 200X. In other embodiments, the helical feature 308 is at least one helical groove (e.g. see groove 332G in FIG. 3). It is contemplated that in other embodiments, the helical feature 308 could include a combination of one or more fins and one or more grooves.

It is also contemplated that the helical feature 308 could be defined by, or could be disposed on, in part or in whole, the inner surface 200S of the first part 200' of the shaft 200. It is also contemplated that in embodiments in which the end portion 300 is disposed over the first part 200' of the shaft 200, the helical feature 308 could be defined by an outer surface 200SO of the first part 200' of the shaft 200 and/or by an inner surface of the end portion 300 to provide the functionality described in this document.

Also, in some embodiments, the helical feature 308 could be structured to move liquid from the axial channel 200A out of the shaft 200 via the lubricant channel(s) 302. In such embodiments, the opening 302B of the lubricant channel 302 serves as an inlet and the opening 302A of the lubricant channel 302 serves as an outlet.

As best shown in FIG. 2A, in the present embodiment, the at least one fin 308F is disposed inside the axial channel 200A of the shaft 200 circumferentially about the rotation axis 200X. As shown, the at least one fin 308F is a helical fin that is rectangular in cross-section and extends radially outward from the outer surface 300S of the appendix 300A. In other embodiments, the fin(s) 308F may have a different cross sectional shape and/or may be a separate part(s) attached to the appendix 300A. It is contemplated that a different number and/or pitch (spacing) of fin(s) 308F could be used depending on each particular embodiment and application of the shaft assembly 101.

In the present embodiment, the appendix 300A of the end portion 300 and the helical feature 308 are coaxial with the first part 200' of the shaft 200. It is contemplated that the helical feature 308 could be of a different type of element that moves lubricant when the first part 200' of the shaft 200 rotates relative to the end portion 300 about the rotation axis 200X. It is contemplated that the helical feature 308 (e.g. the one or more fins) could be manufactured separate from the end portion 300 and attached/fixed to the end portion 300.

It is contemplated that the helical feature 308 could instead be defined by the inner surface 200S of the shaft 200 and that in some such embodiments the corresponding portion of the appendix 300A could be smooth and free from fins and grooves. It is also contemplated that multiple helical features 308 could be used. In some such embodiments, it is contemplated that the helical features 308 could be in series, with at least one of the helical features 308 defined by the first part 200' of the shaft 200 and at least another one of the helical features 308 defined by the end portion 300.

In the present embodiment, a maximum outer diameter of the the helical feature 308 is smaller in diameter than the inner diameter of the axial channel 200A of the shaft 200, so that there is a space between the helical feature 308 and the inner surface 200S of the first part 200' of the shaft 200. This allows the first part 200' of the shaft 200 to rotate freely over the helical feature 308 and the end portion 300 and to thereby operate the helical feature 308 to move lubricant into and through the axial channel 200A. In the present embodiment, this space, and the rest of the annular space 300SP defined between the inner surface 200S of the shaft 200 and the outer surface 300S of the end portion 300, is seal-free and bearing-free.

The shaft 200 may further include an annular seal 310 disposed between the helical feature 308 and the end 200B of the first part 200' of the shaft 200 that receives the end portion 300. The seal 310 at least substantially hydraulically seals the end 200B of the first part 200' of the shaft 200. In the present embodiment, the seal 310 is a labyrinth seal 310 defined by the outer surface 300S of the end portion 300. In the present embodiment, the seal 310 is integral to the rest of the end portion 300 and is smaller in diameter than the inner diameter of the axial channel 200A of the first part 200' of the shaft 200, so that there is a minute gap/space between the seal 310 and the inner surface 200S of the shaft 200, allowing the first part 200' of the shaft 200 to freely rotate over the helical feature 308.

It is contemplated that the seal 310 could be a different seal, such as one or more carbon seals, O-rings, etc, on a surface of the first part 200' of the shaft 200 for example. It is contemplated that the seal 310 could be manufactured separate from the end portion 300 and attached/fixed to the end portion 300. It is also contemplated that the seal 310 could be defined by the inner surface 200S of the first part 200' of the shaft 200. It is also contemplated that multiple seals 310 could be used.

Figure 2C:
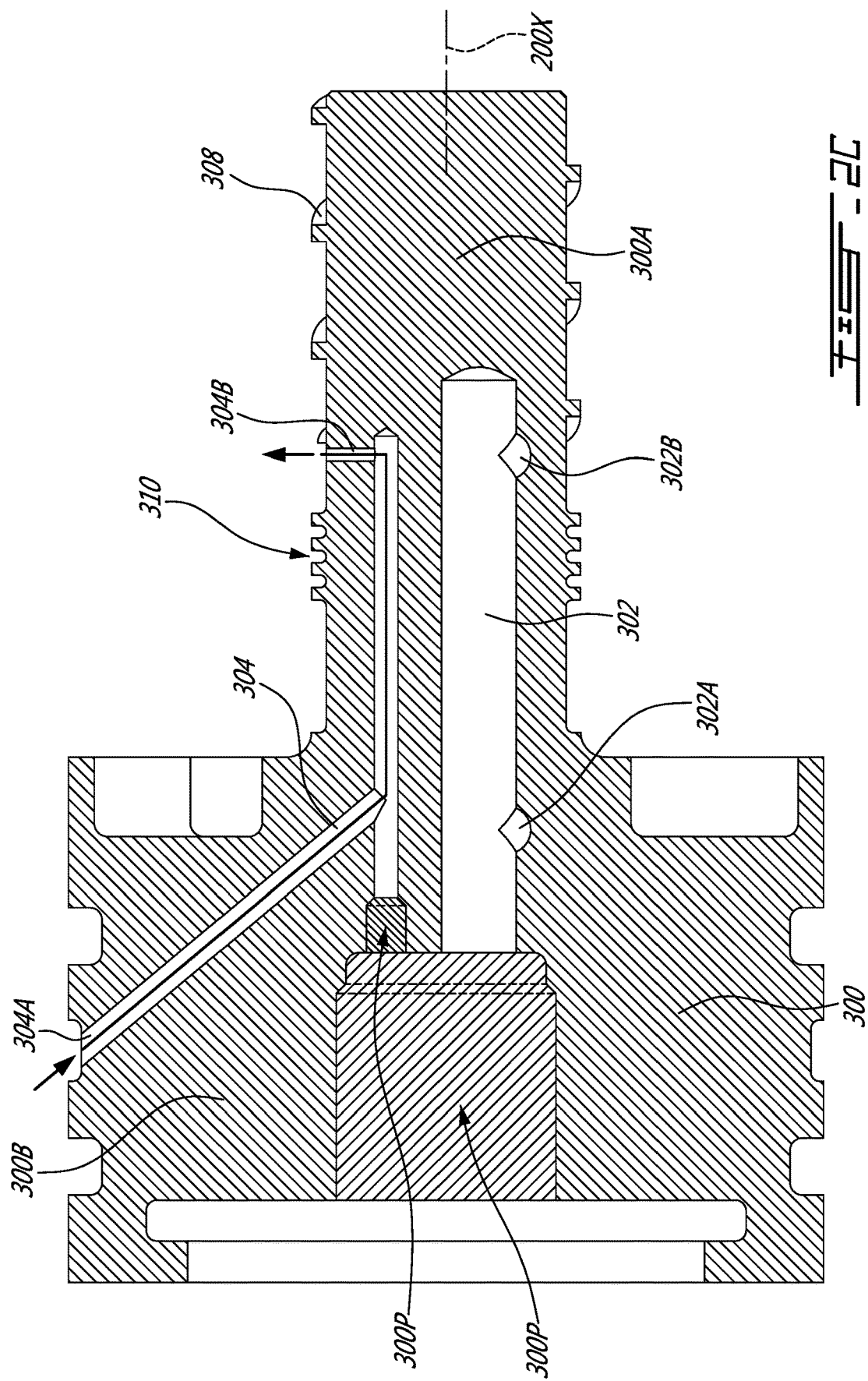
FIG. 2C is a cross-sectional view of the end portion of FIG. 2A, taken along plane C-C in FIG. 2A.
Figure 20:
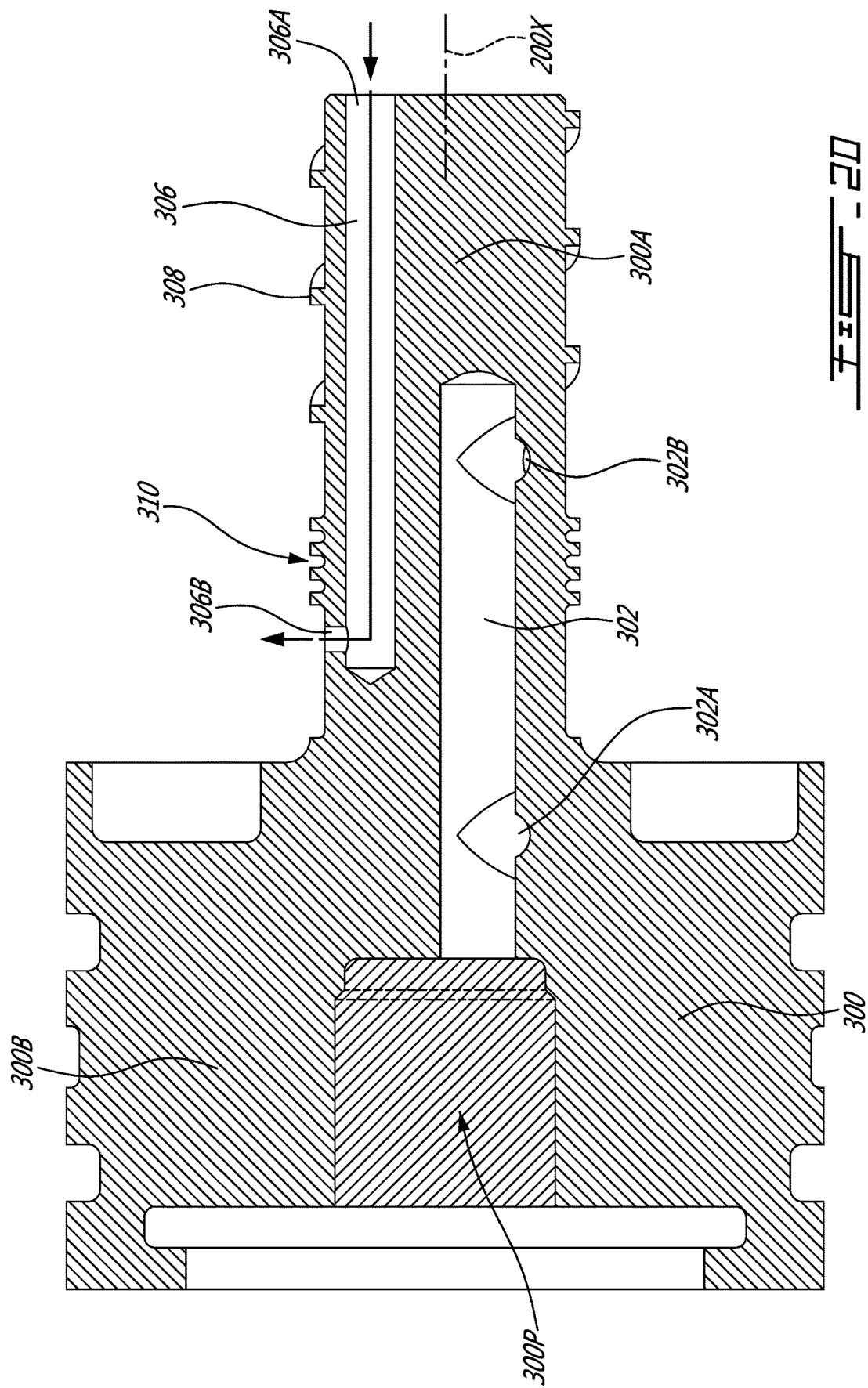

As schematically shown in FIG. 1, and in FIG. 2C, the end portion 300 further defines therethrough a priming lubricant channel 304 along plane C-C shown in FIGS. 2A and 2C. The priming lubricant channel 304 includes an opening 304A that is hydraulically connected to a liquid conduit 106 of the lubrication system 104 and serves as an inlet to the priming lubricant channel 304 in the present embodiment. As shown in FIG. 1, the liquid conduit 106 is defined at least in part by the machine frame 102 and supplies lubricant to various one or more parts of the APU 100 in addition to supplying priming lubricant to the priming lubricant channel 304. In some cases, at least part of the lubrication system 104 is pressurized prior to rotating the first part 200' of the shaft 200 to move at least some lubricant from the lubrication system 104 into an interface 309 defined between the first part 200' and the end portion 300 to prime the interface 309 and the pump 200".

It is contemplated that the liquid conduit 106 could be defined in any suitable way and/or in any suitable part(s) of the APU 100. It is contemplated that the liquid conduit 106 could hydraulically connect to any suitable part of the lubrication system 104. It is contemplated that the lubrication system 104 could include one or more liquid return conduits for recirculating at least some of the lubricant supplied to one or more components of the APU 100. It is also contemplated that the liquid conduit 106 could be part of a lubrication system that is separate from, or otherwise redundant to, the lubrication system 104.

The lubrication system 104 is shown as being internal to the APU 100. It is contemplated that a given machine, such as the APU 100, that implements the present technology as described herein, could have/use an external lubrication system instead of or in addition to an internal lubrication system. It is also contemplated that in some embodiments, and depending on the particular application of the present technology and/or the particular type of machine with which the present technology is used for example, the lubrication system 104 could instead be a cooling system and that accordingly the lubricant may be a different type of liquid pumped/moved by the helical feature(s) 308 of the shaft 200. Yet other liquid systems and/or liquids are also contemplated.

In the present embodiment, and as shown in FIGS. 1 and 2C, the priming lubricant channel 304 extends from the opening 304A to an opening 304B defined in the appendix 300A, via the base 300B and the appendix 300A of the end portion 300. The opening 304B in this embodiment serves as an outlet from the priming lubricant channel 304. The opening 304B opens into the annular space 300SP defined between the inner surface 200S of the shaft 200 and the outer surface 300S of the end portion 300, and faces the inner surface 200S of the first part 200' of the shaft 200. In the present embodiment, an axis of the opening 304B is radial to the inner surface 200S, could be angled relative thereto.

As shown in FIG. 1, the opening 304B is disposed at the outer surface 300S of the end portion 300 between the helical feature 308 and the seal 310. In the present embodiment, the lubrication system 104 is adapted to supply lubricant into the annular space 300SP defined between the inner surface 200S of the first part 200' of the shaft 200 and the outer surface 300S of the end portion 300 at least when the shaft 200 is stationary relative to the end portion 300. The priming lubricant channel 304 thereby primes the interface 309, and thus also an interface between the helical feature 308 and the inner surface 200S of the shaft 200 with lubricant, independent of whether or not the shaft 200 is rotating relative to the end portion 300.

Still referring to FIG. 1, in the present embodiment, the end portion 300 is supported in the machine frame 102 of the APU 100 by being received in an aperture 102A defined through a part of the machine frame 102. As schematically shown in FIG. 1, the aperture 102A is cylindrical in shape and is coaxial with the shaft 200. Also as shown, the end portion 300 is received in the aperture 102A and into the axial channel 200A. A pair of annular seals 300BR received in corresponding annular grooves (not labeled) that are likewise coaxial with the shaft 200, hydraulically seal the interface between the outer surface of the base 300B of the end portion 300 and the surface of the machine frame 102 defining the aperture 102A.

The seals 300BR thereby block priming oil from leaking out from the interface between the base 300 and the frame 102. In the present embodiment, the base 300B of the end portion 300 is smaller in diameter than the diameter of the aperture 102A in which the base 300B is received, thereby allowing some translational movement, in some embodiments in any one of two opposite directions, between the end portion 300 and the machine frame 102 and the first part 200' of the shaft 200 along the rotation axis 200X of the shaft 200 and/or some pivoting movement of the end portion 300 about the rotation axis 200X. This translational and/or pivotable connection, in combination with the coaxial arrangement of the shaft 200, the end portion 300, and the aperture 102A, in at least some embodiments and applications of the shaft assembly 101, allows the end portion 300 to self-center inside the shaft 200 during operation of the APU 100 and/or to absorb at least some expansions and/or contractions of the shaft 200 that may occur during use due to variations in temperature.

It is contemplated that in some embodiments, the end portion 300 could be fixed to the machine frame 102. It is also contemplated that in some embodiments, the end portion 300 could be made integral with and/or could otherwise be part of the machine frame 102. It is also contemplated that in some embodiments, the end portion 300 could be made rotatable relative to the machine frame 102 about the rotation axis 200X.

Still referring to FIG. 1, and in FIG. 2D, in the present embodiment, the end portion 300 further defines an air vent channel 306 therethrough along plane D-D shown in FIGS. 2A and 2D. The air vent channel 306 is at one end is hydraulically connected to the axial channel 200A of the shaft 200 and at another end hydraulically connects either to a part of the lubricant cavity 104R that does not contain lubricant, to another container, or to atmosphere, depending on each particular embodiment and application of the APU 100. To this end, and now referring to FIGS. 1 and 2D, the air vent channel 306 includes an opening 306A defined in an end of the appendix 300A. The air vent channel 306 may be at a location that is assymetrical relative to the shape of the end of the appendix 300A. An opening 306B allows air to escape, and is located in an support portion of the appendix 300A (relative to an horizontal orientation of the machine 100). A pressure relief valve may be present.

The air vent channel 306 vents air that may from time to time be introduced into the axial channel 200A of the shaft, and in some embodiments pressurizes the air space to the left of the seal 310. Notably, in the present embodiment, the air vent channel 306 is defined through the end portion 300 separately from the the priming lubricant channel 304 and does not hydraulically connect to the priming lubricant channel 304 via any point inside the end portion 300. It is contemplated that at least in some embodiments of the present technology, the air vent channel 306 could be omitted and/or may be defined through other parts of the APU 100/machine 100.

As can be seen from FIGS. 2A to 2D, in the present embodiment the channels 302, 304 and 306 are defined in the end portion 300 along different planes (B-B, C-C, and D-D, respectively) passing through the end portion 300. It is contemplated that in other embodiments, one or more of the channels 302, 304 and 306 may be axially in-line, and that in some embodiments channels 302 and 304 may hydraulically interconnect within the end portion 300.

In the present embodiment, the channels 302, 304 and 306 do not hydraulically interconnect to each other at any location inside the end portion 300. Also as can be seen from FIGS. 2A to 2D, in the present embodiment, the channels 302, 304 and 306 are defined by bores drilled into the end portion at respective locations, with plugs 300P, or other suitable elements, being subsequently inserted into parts of the bores to define the channels 302, 304, 306 as described in this document. It is contemplated that a different manufacturing method could be used. For example, it is contemplated that the end portion 300 may be manufactured with the channels 302, 304, 306 therethrough by additive manufacturing, in which embodiments the plugs 300P could be omitted.

Now referring to FIG. 3, an end portion 330 is shown. The end portion 330 is similar to the end portion 300 and features of the end portion 330 are labeled with the reference numerals of corresponding features of the end portion 300. A difference between the end portion 330 and the end portion 300 is that the end portion 330 defines a different helical feature 332. The helical feature 332 includes a cylindrical portion 332C that is larger in diameter than an intermediate portion 330M of the cylindrical appendix 330A of the end portion 330 that defines the opening 304B of the priming lubricant channel 304 therein. The cylindrical portion 332C of the helical feature 332 is smaller in diameter than the axial channel 200A of the first part 200' of the shaft 200 that the helical feature 332 is received in and thereby allows the first part 200' of the shaft 200 to rotate freely over the helical feature 332.

The cylindrical portion 332C defines at least one groove 332G therein, is defined circumferentially around the cylindrical portion 332C and extends from an outer end 332A of the cylindrical portion 332C to an inner end 332B of the cylindrical portion 332C. In the present embodiment, the at least one groove 332G is helical in shape. In embodiments of the shaft assembly 101 that have the end portion 330, when the first part 200' of the shaft 200 rotates about the rotation axis 200X over the at least one groove 332G, the at least one groove 332G moves lubricant from the lubrication system 104, via the at least one groove 332G, into the axial channel 200A of the first part 200' of the shaft 200. The lubricant may thereafter flow via the axial channel 200A through additional channel(s) defined through the first part 200' of the shaft 200 to one or more components of the APU 100 requiring lubrication and/or cooling.

It is contemplated that in some embodiments and/or applications of the present technology, the helical feature 332 could be structured to pump/move lubricant in an opposite direction, from the axial channel 200A and out of the shaft 200 via the lubricant channel 302. It is contemplated that in some such embodiments, lubricant could recirculate from the lubricant cavity 104R back into the axial channel 200A of the shaft 200 upstream of the helical feature 332 via the return conduit 104RC, and could thereafter flow back to the helical feature 332 to again be pumped out of the shaft 200 and into the lubricant cavity 104R.

Reference is now made to FIG. 4, which illustrates another contemplated use of the present technology. More particularly, FIG. 4 shows a turbofan aeroengine 450 of a type preferably provided for use in subsonic flight, generally comprising in serial flow communication a fan 452 through which ambient air is propelled, a compressor section 454 for pressurizing the air, a combustor 456 in which the compressed air is mixed with fuel and ignited for generating an annular stream of hot combustion gases, and a turbine section 458 for extracting energy from the combustion gases. The fan 452 is an example of a rotor of the engine 450. It is contemplated that the engine 450 may have a different type of rotor(s) and/or may be a different type of engine.

The turbine section 458 includes a low pressure shaft 458L that couples the turbine section 458 to the fan 452 to drive the fan 452, and a high pressure shaft 458H that couples the turbine section 458 to the compressor section 454 to drive the compressor section 454. Components of the engine 450, including the low pressure shaft 458L and the high pressure shaft 458H, are rotatable about a longitudinal center axis 460 of the engine 450.

In this embodiment, the engine 450 further includes a shaft assembly 462 according to the present technology. The shaft assembly 462 is similar to the shaft assembly 101 described above. Therefore, features of the shaft assembly 462 are labeled with the reference numerals of corresponding features of the shaft assembly 101. As shown, in this embodiment, the rotation axis 200X of the shaft assembly 462 is collinear with the longitudinal center axis 460 of the engine 450. It is contemplated that depending on the particular embodiment and application of the shaft assembly 462, this need not be the case.

A difference between the shaft assembly 462 and the shaft assembly 101 is that the shaft assembly 462 is part of the low pressure shaft 458L. As schematically shown in FIG. 4, it is contemplated that the shaft assembly 462 could use the end portion 300 or the end portion 400. It is contemplated that yet another embodiment of the end portion 300, 400 according to the present technology, such as an embodiment having a different type of helical feature, also could be used.

In the embodiment of FIG. 4, the engine 450 is the machine that includes the shaft assembly 462, the machine frame 102 that supports the end portion 300, 400 is a frame of the engine 450, the lubrication system 104 is a lubrication system of the engine 450, and the bearing assembly 108 is a bearing assembly (not shown) of the low pressure shaft 458L.

While in the contemplated example shown in FIG. 4 the present technology is used with respect to the low pressure shaft 458L of a turbofan engine, it is likewise contemplated that the present technology could also be used with respect to other one or more shafts of the engine 450 and/or with respect to one or more rotatable shafts of a different type of engine. For example, it is contemplated that the present technology may be used to provide one or more shafts of a turboprop aeroengine or a turboshaft aeroengine. While in FIG. 4 the end portion 300, 400 is shown as being used at a rear end of a shaft and at a rear part of an engine, it is contemplated that the end portion 300, 400 could instead be used at a front end of a shaft and/or at a front part of an engine.

The shaft assemblies 101, 462 of the present technology, and the related components and machine(s) in which the shaft assemblies may be used, may be constructed using known materials and manufacturing methods.

With the above embodiments in mind, the present technology provides a method of cooling a machine 100, such as the APU 100 or an electric generator.

For example, in some electric generator embodiments, the method includes operating the electric generator, with heat generated by the electric generator being transferred into a liquid in a liquid cooling system. As an example with regard to FIG. 1, element 100 may be the electric generator, and element 104 may be the liquid cooling system. The method may further include rotating the first part 200' of the shaft 200 of the electric generator 100 about the rotation axis 200X relative to a second part (e.g. the end portion 300) of the shaft 200, with the helical feature 308 being disposed between the first part 200' and the second part 300 to define the helical pump 200" between the first part 200' and the second part 300, and with the rotating the first part 200' causing the helical pump 200" to circulate at least some of the liquid (in the example above, oil) through the first part 200' of the shaft 200.

Further, in some embodiments, the rotating of the first part 200' of the shaft 200 causes the helical pump 200" to circulate at least some of the liquid through the liquid cooling system 104.

Also in some embodiments, the method includes, before the rotating of the first part 200' of the shaft 200, pressurizing at least part of the liquid cooling system 104 to move at least some of the liquid therefrom into an interface 309 between the first part 200' and the second part 300 of the shaft 200 and thereby priming the interface 309.

As seen in the embodiments above, in some embodiments of the machine 100 and the shaft 200, the priming of the interface 309 includes supplying the at least some of the liquid into the interface 309 via a channel 304 defined through the second part 300 of the shaft 200.

Figure 5:
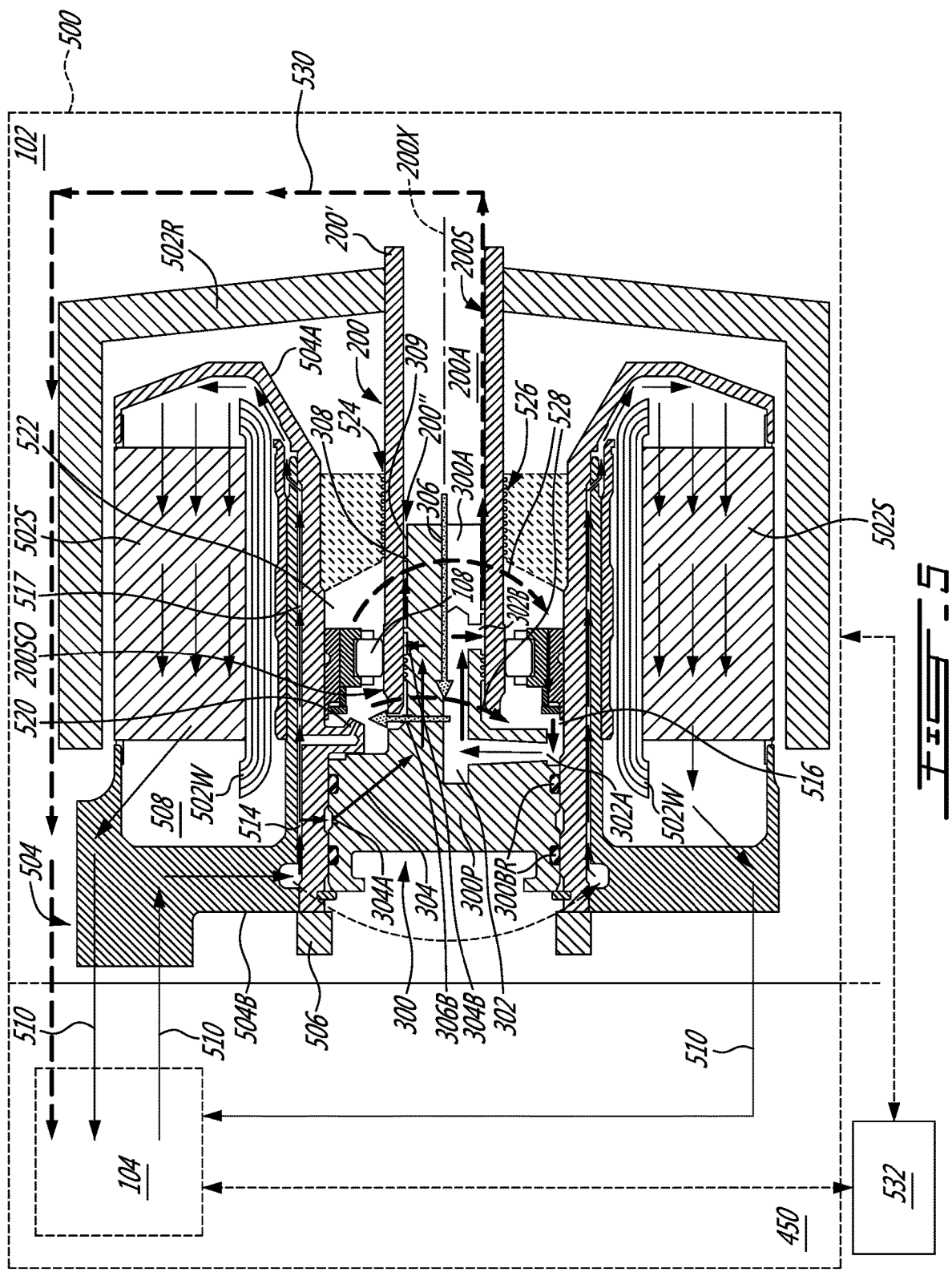
FIG. 5 is a schematic showing a machine implemented according to the present technology.

Now referring to FIG. 5, there is shown a machine 500, and more particularly an electric motor 500, for an aircraft. The machine 500 includes some parts that are analogous to parts of the APU 100 described above. Accordingly, parts of the machine 500 that are analogous to parts of the APU 100 have been labeled with the same reference numerals and are not described herein in detail again, to maintain clarity of this description. The electric motor 500 includes a stator 502S that is stationary relative to the frame 102 of the electric motor 500, and a rotor 502R that is rotatable relative to the stator 502S. In this embodiment, an electric current may be applied to the windings 502W of the stator 502S to rotate the rotor 502R relative to the stator 502S, and thus to drive one or more loads associated with the aircraft.

For example, in some embodiments the electric motor 500 may be sized and connected to one or more accessories of the aircraft, and may be operable to power the one or more accessories. As another example, in some embodiments the electric motor 500 may be sized and connected to an engine of the aircraft, such as the aircraft engine 450 described above. In such embodiments the electric motor 500 may be operable to spool up the engine 450 to execute a start-up sequence of the engine 450. In some embodiments, and depending on the particular application of the electric motor 500 for example, the rotor 502R may be rotated relative to the stator 502S, for example by a suitable power source from the aircraft such as the engine 450, to generate electricity. In such cases, the electric motor 500 acts as, and thus is, an electric generator.

As shown in FIG. 5, the rotor 502R is supported on a shaft 200 of the electric motor 500, and more particularly on the first part 200' of the shaft 200 that is rotatable about the rotation axis 200X of the electric motor 500. The first part 200' of the shaft 200 is supported on the frame 102 via one or more suitable bearings 108, and receives therein a second part 300 of the shaft 200, which in this embodiment is the end portion 300. In this embodiment, the cylindrical base/plug 300P of the end portion 300 is received in a corresponding cylindrical aperture 102A defined by a first machine housing 504A. One or more resilient seals 300BR are disposed between the base/plug 300P of the end portion 300 and the first machine housing 504A and allow the end portion 300 to pivot but not rotate about the rotation axis 200X. In at least some embodiments, this construction may allow the end portion 300 (a.k.a. second part 300 of the shaft 200) to translate along the rotation axis 200X relative to the first machine housing 504A and the first part 200' of the shaft 200.

In this embodiment, the first machine housing 504A is part of the frame 102, and the frame 102 includes a second machine housing 504B. The second machine housing 504B engages the first machine housing 504A and is held against the first machine housing 504A with a suitable threaded threaded nut 506 or other suitable securement. The first and second machine housings 504A, 504B define therebetween a cavity 508 which houses at least part of the stator 502S and the windings 502W.

The first and second machine housings 504A, 504B also define therethrough and therebetween at least a part of a recirculation flow path 510 through which the lubrication system 104 of the electric motor 500 circulates lubricant, such as a suitable oil for example. To define the recirculation flow path 510, any structure and/or sealing arrangement(s) that are suitable for each particular application of the electric motor 500 may be used. For example, in some embodiments, the rest of the recirculation flow path 510 may be defined by one or more lubricant lines and/or filters and/or pumps. Such elements may be conventional in some embodiments and are therefore not described herein in detail.

As shown, the recirculation flow path 510 circulates lubricant from the lubrication system 104 through the stator 502S for cooling. In the present embodiment, some lubricant in the lubrication system 104 is circulated through the first part 200' of the shaft 200 via the second part (end portion) 300, and/or through other parts of the electric motor 500. more particularly, in this embodiment pressurized lubricant comes from the lubrication system 104 via the recirculation flow path 510 to travel between the first and second machine housings 504A, 504B. To this end, in this embodiment, the first and second machine housings 504A, 504B define an annular lubricant channel 517 therebetween, which forms part of the recirculation flow path 510.

As shown, in this embodiment, the annular lubricant channel 517 is in fluid communication, and feeds lubricant to, the priming lubricant channel 304, and one or more oil jets 520 (which may be other delivery mechanisms in other embodiments). The one or more oil jets 520 deliver lubricant to a cavity 522 defined between the first machine housing 504A and an outer surface of the first part 200' of the shaft 200. As shown, in this embodiment, the cavity 522 contains the bearing 108 and a part of an outer surface of the first part 200' of the shaft 200. The cavity 522 is fluidly sealed from a rest of the outer surface of the first part 200' of the shaft 200 at a sealed interface 524 defined between a respective portion of the first machine housing 504A and a respective portion of the outer surface of the first part 200' of the shaft 200. In this embodiment, and although this could be different in other embodiments, the interface 524 is defined by a labyrinth seal 526. As an example, it is contemplated that the seal 526 may be a different one or more seals.

As shown with arrows 528 in FIG. 5, lubricant (in this embodiment, oil), supplied into the cavity 522 lubricates the bearing 108 and moves around the part of the outer surface of the shaft 200 that is disposed in the cavity 522 to the inlet 302A of the lubricant channel 302, for subsequent delivery via the lubricant channel 302 and the helical feature 308 into the axial channel 200A of the shaft 200, as described in this document. As shown with reference arrow 530, from the axial channel 200A, lubricant may move to other parts of the machine 500 and eventually back into the lubrication system 104 as recirculated lubricant flow, via any suitable combination and arrangement of parts and channels of the machine 500 for example. It is contemplated that these part and channels may be conventional in some embodiments, may be selected to suit each particular embodiment of the machine 500 for example, and are therefore not described herein in detail.

As an example, in some embodiments, the lubrication system 104, and/or at least some parts that may in part define the flow path 530, may be part of an aircraft lubrication system, such as an engine lubrication system for example. As another non-limiting example, the lubrication system 104 and/or the flow path 530 may include one or more pumps. As a more particular non-limiting example, one or more such pumps may be provided upstream or downstream of the lubrication network provided by the shaft 200 and the first and second machine housings 504A, 504B as described herein. That is, still referring to FIG. 5, the lubrication network for example includes the lubricant channel 302 which provides lubricant into the axial channel 200A of the shaft 200 via the interface 309 defined between the first part 200' and the end portion 300 of the shaft 200 that contains the helical feature 308, during operation of the electric motor 500.

In another aspect, and still referring to FIG. 5, some lubricant in the lubrication system 104 is circulated through the first part 200' of the shaft 200 via a priming flow path. In the present embodiment, the priming flow path is provided by the priming lubricant channel 304 in the end portion 300, but additional and/or other passage(s) and/or elements may be used in other embodiments. The priming lubricant channel 304 defining the priming flow path has an effective diameter that is smaller than the effective diameter of the lubrication flow path 302, and provides a smaller flow rate of lubricant into the interface 309 between the first and second parts 200', 300 of the shaft 200 than the lubrication flow path 302.

As shown in FIG. 5, in this embodiment, the inlet 304A to the priming lubricant channel 304 is fluidly connected to the recirculation flow path 510 at a location that is upstream of the location at which the inlet 302A to the lubrication flow path 302 is fluidly connected into the recirculation flow path 510. Accordingly, the pressure of lubricant at the inlet 304A to the priming lubricant channel 304 is higher than the pressure of lubricant at the inlet 302A to the to the lubrication flow path 302 when the lubrication system is in use. Therefore, in the present embodiment, the priming flow path is said to be fed with lubricant from a lubricant source 514 that is different from a lubricant source 516 feeding the lubrication flow path 302. Also, due to the inlet 304A to the priming lubricant channel 304 being upstream of and at a higher pressure than the inlet 302A to the lubrication flow path 302, in at least some embodiments when the lubrication system 104 is started, lubricant from the lubrication system 104 reaches the interface 309 in the shaft 200 first via the priming lubricant channel 304 and subsequently via the lubrication flow path 302.

In at least some embodiments, this may help prime the pump 200" defined by the shaft 200. In at least some embodiments, this may help prime the pump 200" defined by the shaft 200 prior to starting the pump 200", and this may in turn help improve efficiency and or reliability of the pump 200". Also, in at least some cases and/or applications and/or operating conditions, for example in an aircraft application when the lubricant source 516 may become temporarily interrupted or otherwise disrupted, for example during quick aircraft attitude changes during maneuvering, the interface 309 of the shaft 200 may continue to receive lubricant from the priming lubricant channel 304. This may help improve reliability of the pump 200" and hence of the machine 500.

In this embodiment, the lubricant sources 514, 516 are fluidly part of the same lubrication system 104, however this need not be the case in other embodiments. In some embodiments, one or more flow control devices may be used to define and/or control flow rate and/or pressures associated with the priming lubricant path/channel 304 relative to the lubrication flow path 302. In at least some embodiments, the effective flow diameter (and hence pressure drop) of the flow path leading to the inlet 304A of the priming lubricant channel 304 and effective flow diameter of the priming lubricant channel 304, as well as the clearances between the first and second parts 200', 300 of the shaft 200, may be selected such that a pressure of lubricant provided by the lubrication system 104 at least when the lubrication system 104 is started is sufficient to move at least some lubricant into the interface 309, independent of whether or not the first part 200' of the shaft 200 is rotating and/or independent of whether or not the lubricant source 516 may be operative.

Further in the present embodiment, and referring also to FIG. 4, the lubrication system 104 may be operatively connected to and thus be operable via any one or more controllers 532, such as one or more conventional controllers selected to suit each particular embodiment and application of the machine 500. In some embodiments, the one or more controllers could be one or more full authority digital controllers (FADEC) of an engine 450 with which the machine 500 may be used. While in some embodiments, the lubrication system 104 may be dedicated to and/or part of the machine 500, in other embodiments, and for example in the embodiment shown in FIG. 4, at least a part of the lubrication system 104 may be part of a lubrication system of the engine 450, such as a conventional gas turbine engine lubrication system for example.

In some embodiments, the lubrication system 104 may be operatively connected to the one or more controllers 532 and or to one or more controllers of the engine 450 that may be operatively connected to interoperate with the one or more controllers 532 for example. Each given controls arrangement as described herein may be configured, for example using a conventional control algorithm, to provide for the functionality described herein. For example, such that the lubrication system 104 is operable independently of the machine 500, meaning that the lubrication system 104 may be started (e.g. by the controller(s) 532) without necessarily starting the machine 500.

As a particular non-limiting example, in the present embodiment the machine 500 may be an electric motor 500, and more particularly a starter and/or generator that may be operatively connected to the engine 450, as shown in FIG. 4, via any suitable drive system. The machine 500 may thus for example be operable to start the engine 450 and/or generate electricity after the engine 450 has been started. In other embodiments, the machine 500 may instead be an electric motor connected to and operable to drive one or more shafts of an engine, and need not necessarily be operable as an electric generator. As shown by FIGS. 4 and 5, the machine 500 and/or the lubrication system 104 may be in part or in whole onboard or offboard the engine 450, so long as the functionality described herein is provided.

With the above structure in mind, and still referring to FIG. 5, there is provided a method of priming a pump 200". In some embodiments, the method includes supplying lubricant, such as oil, via a priming flow path, such as the priming flow path defined by the priming lubricant channel 304, into an interface, such as the interface 309, defined between a first part 200' of a shaft 200 of the pump 200" and a second part 300 of the shaft 200 coaxially engaged, as shown in FIG. 5 for example, with the first part 200' of the shaft 200 to define the pump 200". As seen above, the first part 200' of the shaft 200 may be rotatable about a rotation axis 200X relative to the second part 300 of the shaft 200. The method may also include supplying lubricant, such as oil, into the interface 309 via a lubrication flow path 302 that is different from the priming flow path.

In some embodiments, the method may include supplying lubricant to the lubrication flow path 302 from a first lubricant source 516 upstream of the pump 200", and supplying lubricant to the priming flow path from a second lubricant source 514 upstream of the pump 200", the second lubricant source 514 being different from the first lubricant source 516.

In some embodiments, the method may include pressurizing the first lubricant source 516 to a first pressure, and pressurizing the second lubricant source 514 to a second pressure that is different from the first pressure. As seen above, in some embodiments, the pressure at the second lubricant source 514 may be higher than pressure at the first lubricant source 516. In some embodiments, the step of supplying lubricant via the priming flow path may be executed at a lower flow rate and a higher pressure than the supplying lubricant via the lubrication flow path 302. In some embodiments, the supplying lubricant via the lubrication flow path 302 may include moving lubricant through a helical feature 308 disposed in the interface 309.

Further, in some embodiments, the method may include rotating the first part 200' of the shaft 200 about the rotation axis 200X relative to the second part 300 of the shaft 200. In some embodiments, the method may include venting the axial channel 200A of the first part 200' of the shaft 200 through the second part 300 of the shaft 200. As seen above, in some embodiments, the axial channel 200A receives at least a part of the second part 300 therein, receives lubricant from the priming and lubrication flow paths, and distributes this lubricant to one or more parts of a machine 500 that the pump 200" may be used with. Also as seen above, in some embodiments, the method may include fluidly connecting the respective sources 514, 516 of the priming and lubrication flow paths to a lubricant supply of a lubrication system 104 of a machine, such as the machine 500 and/or the engine 450 for example, and fluidly connecting the axial channel 200A downstream of the second part 300 to a return of the lubrication system 104, as shown respectively with arrows 510 and 530 in FIG. 5.

In some embodiments of the method, the step of supplying lubricant into the interface 309 via the priming flow path may be started prior to starting the pump 200". As a non-limiting example where the pump 200" is implemented in the electrical starter/generator 500 of the engine 450 as described above, the one or more controllers 532 associated with the engine 450 and the electrical starter/generator 500 may first start the lubrication system 104, whether the system is dedicated to the electrical starter/generator 500 or is at least in part a lubrication system of the engine 450, thereby pressurizing the priming flow path and injecting lubricant into the interface 309. The one or more controllers 532 may thereafter, for example after a predetermined time period or after a signal from one or more sensors providing feedback to confirm that the lubrication system 104 has successfully started up, energize the windings 502W of the electrical starter/generator 500 to start rotating the rotor 502R and hence the first part 200' of the shaft 200 relative to the second part 300 of the shaft 200.

Hence, in some embodiments, the step of starting the pump 200" includes rotating the first part 200' of the shaft 200 relative to the second part 300 of the shaft 200 about the rotation axis 200X. In some embodiments, the method may include allowing the second part 300 of the shaft 200 to pivot about the rotation axis 200X. In some embodiments, the method may include allowing the second part 300 of the shaft 200 to translate relative to the first part 200' of the shaft 200 along the rotation axis 200X.

In another aspect, and referring to FIGS. 4 and 5, there is provided a method of lubricating an aircraft motor, such as the electrical starter/generator 500 and/or an aircraft engine 450 where as described above for example a shaft assembly 462 of the present technology is implemented with the engine 450. In some such embodiments, the method may include supplying lubricant into a shaft, such as the shaft 200, 458L, and/or 458H, of the motor from a first lubricant source 516, and supplying lubricant into the shaft of the motor from a second lubricant source 514 that is different from the first lubricant source 516. In some such embodiments, the method may include pressurizing the first lubricant source 516 to a first pressure, and pressurizing the second lubricant source 514 to a second pressure that is different from the first pressure. As seen above, in some such embodiments, the second pressure is higher than the first pressure.

Also as seen above, in some such embodiments, the operating the motor includes rotating a first part (e.g. 200' and/or 458L and/or 458H, depending on the embodiment) of the shaft about a rotation axis 200X relative to a second part (e.g. 300 and/or 400, depending on the embodiment) of the shaft engaged with the first part of the shaft coaxially with the first part (e.g. 200' and/or 458L and/or 458H for example, depending on the embodiment) of the shaft, and the supplying lubricant from the two lubricant sources 516, 514 is through the second part (e.g. 300 and/or 400, depending on the embodiment) of the shaft.

Also as seen above, in some such embodiments, the method may include circulating lubricant from the first and second lubricant sources 516, 514 through the first part (e.g. 200' and/or 458L and/or 458H, depending on the embodiment) of the shaft and/or through a lubrication system 104 of the motor (e.g. 450 and/or 500, depending on the embodiment), and venting the lubricant flow path 302 through the second part e.g. 300 and/or 400, depending on the embodiment) of the shaft.

The above description is meant to be exemplary only, and one skilled in the art will recognize that changes may be made to the embodiments described without departing from the scope of the invention disclosed. For example, while the end portion 300 described above includes an air vent channel 306 in some embodiments, in other embodiments the air vent channel 306 may be omitted. Still other modifications which fall within the scope of the present invention will be apparent to those skilled in the art, in light of a review of this disclosure, and such modifications are intended to fall within the appended claims.

The invention claimed is:

1. A method of priming a lubricant pump of an aircraft engine, comprising:

supplying lubricant, via a priming flow path, into an interface defined between a first part of a shaft of the pump and a second part of the shaft coaxially engaged with the first part of the shaft to define the pump, the first part of the shaft rotatable about a rotation axis relative to the second part of the shaft;

supplying lubricant into the interface via a lubrication flow path that is different from the priming flow path; and venting an axial channel of the first part of the shaft through the second part of the shaft.

2. The method of claim 1, comprising supplying lubricant to the lubrication flow path from a first lubricant source upstream of the pump, and supplying lubricant to the priming flow path from a second lubricant source upstream of the pump, the second lubricant source being different from the first lubricant source.

3. The method of claim 2, comprising pressurizing the first lubricant source to a first pressure, and pressurizing the second lubricant source to a second pressure that is different from the first pressure.

4. The method of claim 3, wherein the supplying lubricant via the priming flow path is executed at a lower flow rate and a higher pressure than the supplying lubricant via the lubrication flow path.

5. The method of claim 4, comprising rotating the first part of the shaft about the rotation axis relative to the second part of the shaft.

6. The method of claim 5, wherein the supplying lubricant via the lubrication flow path includes moving lubricant through a helical feature disposed in the interface.

7. The method of claim 1, wherein the supplying lubricant into the interface via the priming flow path is started prior to starting the pump.

8. The method of claim 7, wherein the starting the pump includes rotating the first part of the shaft relative to the second part of the shaft about the rotation axis and the method further comprising allowing the second part of the shaft to pivot about the rotation axis.

9. The method of claim 1, comprising allowing the second part of the shaft to translate relative to the first part of the shaft along the rotation axis.

\* \* \* \* \*